United States Patent [19]

Majetich et al.

[11] Patent Number: 5,456,986
[45] Date of Patent: Oct. 10, 1995

[54] MAGNETIC METAL OR METAL CARBIDE NANOPARTICLES AND A PROCESS FOR FORMING SAME

[75] Inventors: Sara Majetich; Michael McHenry; Joseph Artman, all of Pittsburgh; Stuart Staley, Hidden Valley, all of Pa.

[73] Assignee: Carnegie Mellon University, Pittsburgh, Pa.

[21] Appl. No.: 85,298

[22] Filed: Jun. 30, 1993

[51] Int. Cl.$^6$ ........................................ B32B 15/02
[52] U.S. Cl. ........................... 428/403; 148/105; 148/108; 148/278; 423/445 R; 423/448; 428/404; 428/408; 428/698; 428/699
[58] Field of Search ..................................... 428/403, 404, 428/408, 698, 699, 694 TC; 106/286.1, 286.8; 501/87; 423/439, 445 R, 448; 209/3, 213, 214, 227; 148/105, 108, 278, 565

[56] References Cited

U.S. PATENT DOCUMENTS

| 5,176,260 | 1/1993 | Oder | 209/212 |
| 5,248,498 | 9/1993 | Neumann et al. | 424/9 |
| 5,304,366 | 4/1994 | Lorents et al. | 423/445 B |

FOREIGN PATENT DOCUMENTS 1357777  3/1964  France .

OTHER PUBLICATIONS

P. Byszewski et al. "Weak Ferromagnetism Of Fe Intercalated Fullerides, European Conference, Physics of Magnetism", *ACTA Physica Polonica A*, vol. 85, No. 2, pp. 298–299, Feb. 1994.

J. Svoboda, *Magnetic Methods For The Treatments Of Minerals*, pp. 3–4 (1987).

M. E. McHenry et al., *Physical Review, B. Condensed Matter*, vol. 49, No. 16, pp. 11358–11363, (Apr. 1994).

B. Diggs et al., *Journal of Applied Physics*, vol. 75, No. 10, (May 1994).

S. A. Majetich et al., *Physical Review, B. Condensed Matter*, vol. 8, No. 22, (Dec. 1993).

R. S. Rouff, D. C. Lorents, B. Chan, R. Malhotra and S. Subramoney, "Single Crystal Metals Encapsulated In Carbon Nanoparticles", *Science*, vol. 259, p. 346 (1993).

M. Tomita, Y. Saito and T. Hayashi, "LaC$_2$ Encapsulated in Graphite Nano–Particle", *Jpn. J. Appl. Phys.*, vol. 32, p. 280 (Feb. 1993).

*Primary Examiner*—D. S. Nakarani
*Assistant Examiner*—H. Thi Lê
*Attorney, Agent, or Firm*—Buchanan Ingersoll; Michael L. Dever

[57] ABSTRACT

A magnetic metal or metal carbide nanoparticle is provided having a carbon coating. The nanoparticle has a diameter in the range of approximately 5 to 60 nm, and may be crystalline or amorphous. The magnetic metal or metal carbide nanoparticle is formed by preparing graphite rods which are packed with a magnetic metal oxide. The packed graphite rods are subjected to a carbon arc discharge to produce soot containing magnetic metal or metal carbide nanoparticles and non-magnetic species. The soot is subsequently subjected to a magnetic field gradient to separate the magnetic metal or metal carbide nanoparticles from the non-magnetic species. Ferromagnetic or paramagnetic compounds are made by starting with graphite rods packed with the oxides of iron, cobalt, nickel and manganese bismuth, or a rare earth element excluding lanthanum, lutetium and promethium, or a paramagnetic transition metal.

10 Claims, 3 Drawing Sheets

MAGNETIC METAL OR METAL CARBIDE NANOPARTICLES AND A PROCESS FOR FORMING SAME

BACKGROUND OF THE INVENTION

1. Field of the Invention

The present invention relates to the field of magnetic metal or metal carbide compounds and carbon-coated magnetic metal or metal carbide compounds. Particularly, the present invention relates to the field of carbon-coated magnetic metal or metal carbide nanoparticles and the methods for preparing the same. Nanoparticles include crystalline or amorphous particles 5 to 60 nanometers in diameter and nanotubes up to 1 centimeter long and 5 to 60 nanometers in diameter.

2. Description of the Prior Art

Small magnetic particles have many applications. Such particles are used as toner in xerography, in ferrofluid vacuum seals, in nuclear magnetic resonance imaging as contrast agents, and in magnetic data storage. These magnetic particles are typically micron-sized in diameter or larger. The large size of these particles renders them less than satisfactory for several specialized applications.

If the magnetic particles were smaller, better resolution would be achieved in xerographic applications. In ferrofluid applications, the enhanced solubility due to carbon coating provided by smaller particles may be advantageous. In magnetic data storage, resolution may be enhanced by using smaller particles. Consequently, there is a potential need for sub-micron sized magnetic metal carbon-coated particles and a method for producing bulk amounts of these particles in a high yield process.

Recently, there has been increased investigation regarding the Kratschmer-Huffman carbon arc method of preparing fullerenes, or small hollow carbon clusters. These fullerenes are typically in the order of 1 nm in diameter. Recently, it has further been discovered that these hollow carbon clusters can be filled with metal ions. This can be accomplished by drilling out the graphite rods and packing them with a mixture of metal oxide powder and graphite cement before generating the soot by the carbon arc. Rodney S. Ruoff, Donald C. Lorents, Bryan Chan, Ripudaman Malhotra, and Shekhar Subramoney, *Science*, Vol. 259, p. 346 (1993) discussed the production of 20–40 nm diameter carbon-coated lanthanum carbide nanocrystallites by this method. Similar results were reported by Masato Tomita, Yahachi Saito and Takayoshi Hayashi in *Jpn. J.Appl. Phys.*, Vol. 32, p. 280 (1993).

The carbon arc method of preparing lanthanum carbide nanocrystallites discussed above generates fullerenes and graphitic soot in addition to the ianthanum carbide nanocrystailites. In order Lo be useful, a means of separating the nanocrystallites is essential. So far, no chemical methods have been found to be successful in separating macroscopic amounts of nanoparticles from graphitic soot and fullerenes. Such separation processes are rendered extremely important when the yields achieved for the nanoparticles is in the order of ten percent or less of the soot. Accordingly, there is a need for a method to separate carbon-coated metal nanoparticles from graphitic soot.

SUMMARY OF THE INVENTION

By using a modification of the Kratschmer-Huffman carbon arc method, carbon coated nanoparticles having a diameter in the range of approximately 5 to 60 nm can be formed. If a paramagnetic rare earth metal oxide or the oxide of a ferromagnetic species is packed into a graphite rod and subsequently subjected to a carbon arc discharge, soot containing magnetic metal or metal carbide nanoparticles and non-magnetic species is formed. The magnetic metal or metal carbide nanoparticles can be separated from the soot by subjecting the soot to a magnetic field gradient.

In the magnetic separation step, the nanoparticle-containing soot is ground to a fine powder and then dropped down an electrically grounded metal tube through a magnetic field gradient created by a pair of strong magnets. Non-magnetic material passes through the tube, but magnetic components are suspended if the field gradient force exceeds the gravitational force. When the apparatus is moved away from the magnets, the magnetic material is released into its own separate collection container. This process can be used to separate paramagnetic or ferromagnetic species from non-magnetic components of the soot produced by the carbon arc discharge process.

DETAILED DESCRIPTION OF THE PREFERRED EMBODIMENTS

A process based on the Kratschmer-Huffman carbon arc method of preparing fullerenes can be used to generate carbon-coated magnetic metal or metal carbide nanoparticles. When combined with a magnetic field gradient separation technique, bulk amounts of these nanoparticles can be isolated.

If graphite rods which are packed with a paramagnetic rare earth metal oxide or the oxide of a ferromagnetic material are subsequently subjected to a carbon arc discharge, the soot produced by the Kratschmer-Huffman carbon arc process contains magnetic metal or metal carbide nanoparticles and non-magnetic species.

A magnetic field gradient can be used to separate the magnetic metal or metal carbide nanoparticles from the non-magnetic species included in the soot. Preferably, the soot produced by the carbon arc discharge method is further ground to a fine powder before being subjected to the magnetic field gradient. If the magnetic field gradient force is greater than the gravitational force, the magnetic nanoparticles will be suspended by the magnets in the separator tube whereas the non-magnetic species will pass through. This magnetic gradient separation technique removes non-magnetic byproducts of the carbon arc discharge process and enhances the magnetic response of the isolated material. This separation process separates all paramagnetic or ferromagnetic components from the remaining soot.

Figure 1:
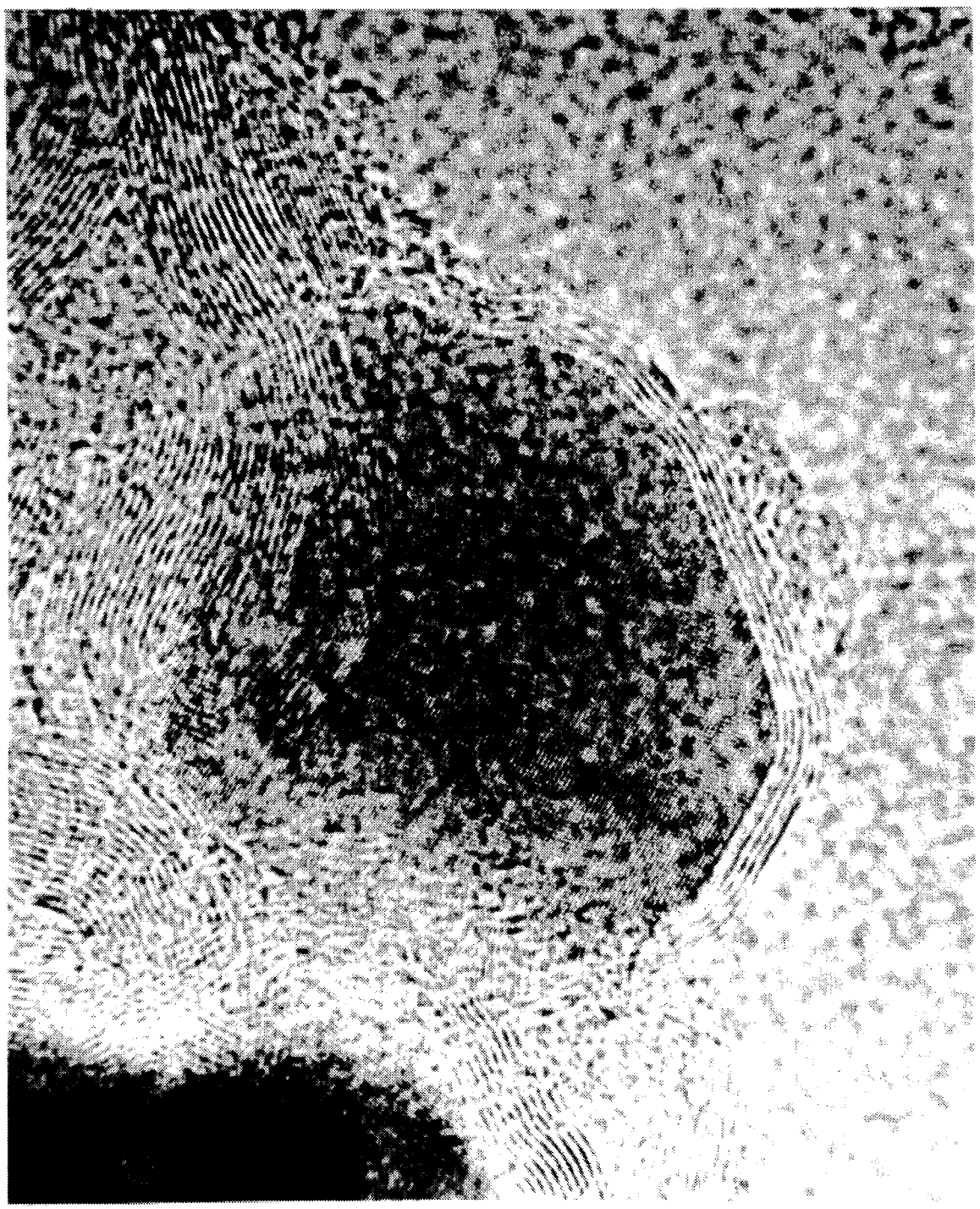
FIG. 1 is a transmission electron micrograph of a carbon-coated gadolinium carbide nanocrystallite formed in accordance with the present invention.

FIG. 1 is a transmission electron micrograph of a gadolinium carbide nanocrystallite, enclosed by several curved graphitic sheets, which was formed in accordance with the present invention. In order to form the gadolinium carbide nanocrystallite shown in FIG. 1, ¼ inch diameter graphite rods were drilled and packed with a mixture of metal oxide powder, in this case $Gd_2O_3$, and a combination of graphite powder and graphite cement. A 1:1 volume ratio of $Gd_2O_3$ and graphite powder bound together with a minimum amount of graphite cement was used. The rods were baked overnight at 300° C. to drive off water vapor. These graphite rods were then used in the upper electrode position in an AC carbon arc. The arc conditions were 100 A and 25 V, and a helium gas pressure of 125 Torr was applied. A DC carbon arc with the same conditions and the filled graphite rod as the positive electrode also yields these nanocrystallites.

The carbon arc discharge process described above produced a soot which included a mixture of graphitic particles, carbon-coated gadolinium carbide nanoparticles and fullerenes. This raw soot was magnetically separated by first grinding it to a fine, micron-sized powder with a mortar and pestle. This ground soot was then passed through a magnetic field gradient to separate the magnetic from the non-magnetic species. In this example, the separator consisted of a funnel, an electrically-grounded aluminum tube with a pair of 1"×1"×½" neodymium iron boron magnets on either side, and a pair of collection flasks. The grounded metal tube prevents electrostatic charging of the powder.

In the separator tube, a paramagnetic particle experiences a gravitational force in addition to a magnetic force proportional to the field gradient, the field $\vec{H}$, and the susceptibility $\chi$ given by the following formula:

$$\vec{F}_M = \chi(\vec{H} \cdot \nabla)\vec{H}$$

In the separator tube, a ferromagnetic particle with a moment $\vec{M}$ experiences a magnetic force given by the following equation:

$$\vec{F}_M = (\vec{M} \cdot \nabla)\vec{H}$$

The aluminum tube was positioned appropriately between the magnets in order to maximize the magnetic force, $\vec{F}_M$. When small amounts of powder were poured through the apparatus, the magnetic species were suspended by the magnets, while the non-magnetic fraction passed through. The collection bottles were switched, and the tube was moved away from the magnets to release the magnetic powder. After the first pass, roughly ⅛th of the original volume was found to be magnetic for the case of gadolinium. For cobalt, 95% of the soot produced was found to be magnetic after the first pass. This powder was passed through repeatedly to enhance the abundance of magnetic material. The final magnetic "filtrate" contained a mixture of magnetic nanocrystallites embedded in a carbon matrix, and possibly small amounts of endohedral fullerenes. The fullerenes were removed by extraction in carbon disulfide. No visible differences were observed between pure carbon soot and the gadolinium-containing mixture. Hence, separation of the gadolinium-containing compounds would have been difficult, if not impossible, without the magnetic separation technique.

The structural properties of the magnetic powder were examined by electron microscopy. Energy dispersive spectroscopy indicated that the gadolinium was uniformly distributed in the magnetic soot. Closer inspection was made with a JEOL 4000 400 key high resolution transmission electron microscope. Samples were prepared by dispersing the powder in methanol with the aid of ultrasound and drying a drop of the solution on an amorphous carbon-coated copper grid. A gadolinium carbide nanocrystallite encased in curved graphitic shells as shown in FIG. 1, along with smaller crystallites enclosed in amorphous carbon, were observed. In some of the larger nanocrystallites with a diameter approximately 50 nm, up to 30 graphitic layers were seen, and some of the particles were faceted.

Figure 2:
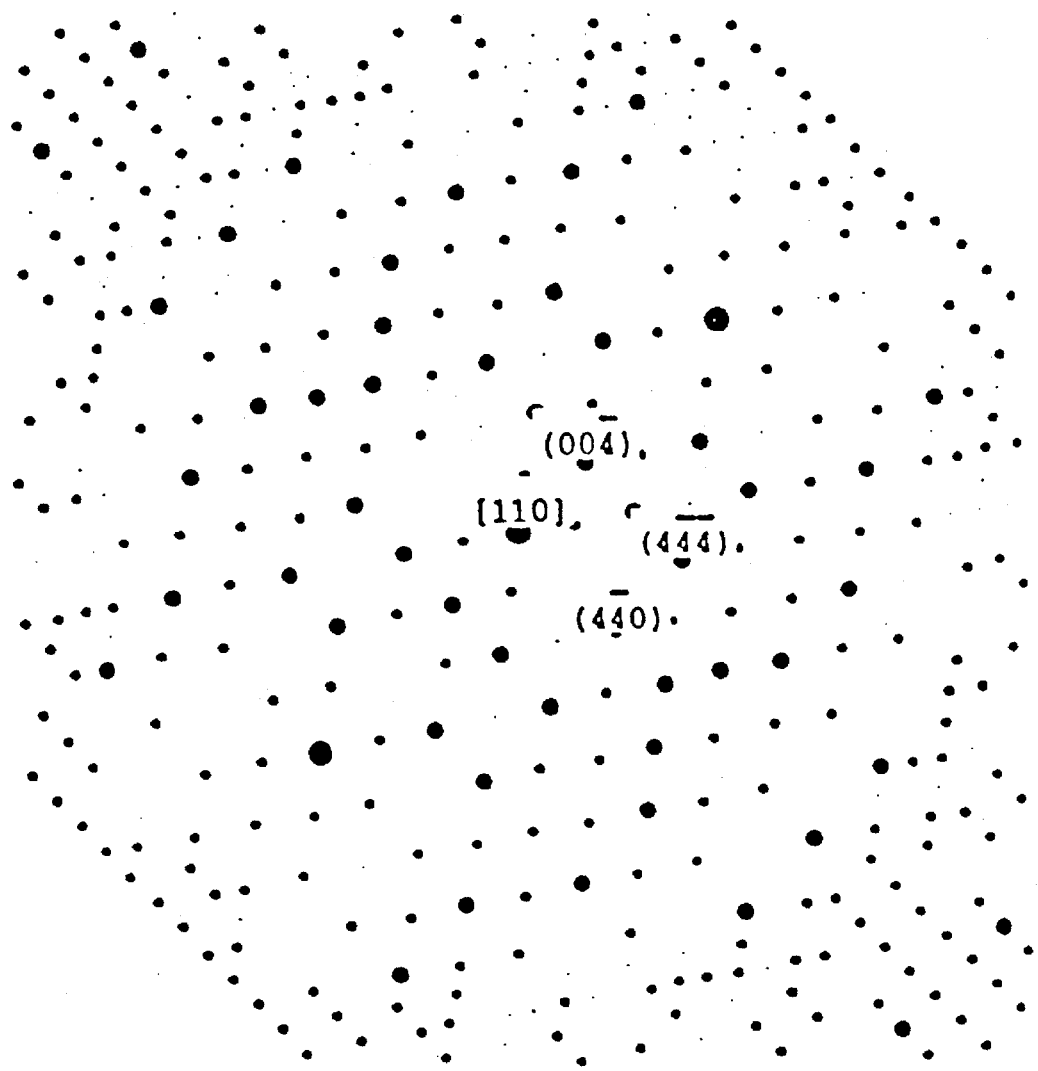
FIG. 2 is an electron diffraction pattern of a gadolinium carbide nanocrystallite formed in accordance with the present invention.

X-ray diffraction of the nanocrystallites with a Rigaku diffractometer revealed sharp peaks indicating the presence of a single $Gd_2C_3$ phase, along with the graphitic peaks and a broadened peak at small angles characteristic of the fullerenes. Comparison with tabulated crystal structures suggest that the most abundant phase is paramagnetic body-centered cubic $Gd_2C_3$. This structural assignment is on the Oasis of both x-ray diffraction peaks and on electron diffraction of a crystalline oriented in the [110] direction as shown in FIG. 2. No evidence was seen for $\alpha\text{-}GdC_2$, $Gd_2C$, or $Gd_2O_3$ phases, or for Gd crystallites. This is different from the case of lanthanum doping, for which $\alpha\text{-}LaC_2$ nanocrystallites were observed.

Room temperature electron paramagnetic resonance spectra of the powder at 9.104 GHz showed a single broad derivative centered at 3130 G, corresponding to a g-value of 2.08. This is consistent with the g-value predicted for a $J=S=\frac{7}{2}$ ground state for a $Gd^{+3}$ ion.

Figure 3:
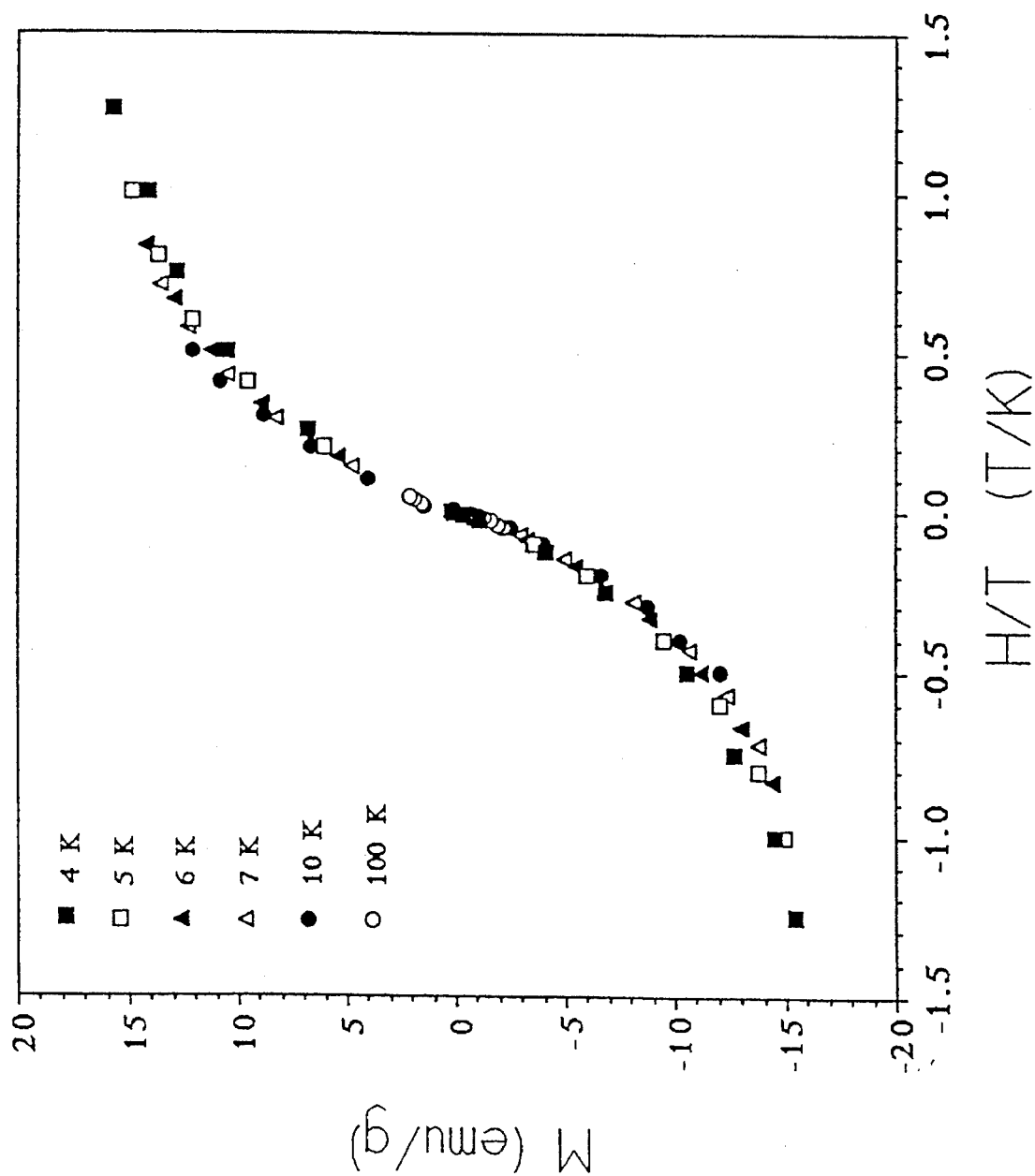
FIG. 3 is a SQUID magnetometer measurement of M(H, T) for a 10 mg nanocrystalline gadolinium carbide specimen separated in accordance with the present invention.

Magnetization data were obtained for powder samples using a Quantum Design SQUID Magnetometer. M(H,T) has been determined in solenoidal fields between ±5 T and for temperatures from 4° to 300° K. FIG. 3 shows magnetization data for different temperatures scaled as a function of H/T. The data fall on a paramagnetic response curve. Fits of this data taken at several temperatures allow assignment of a $J=\frac{7}{2}$ ground state consistent with the EPR results. Ferromagnetic behavior was observed in similar cobalt nanocrystallites.

The encapsulation method, in combination with the magnetic separation technique, has been used to prepare ferromagnetic transition metal complexes containing iron, cobalt, nickel and manganese bismuth, and paramagnetic rare earth metal complexes containing gadolinium and holmium. The encapsulation method can form additional paramagnetic complexes using the rare earth metals except lanthanum, lutetium and promethium. The phases produced appear to be specific to the metal used. However, the production and separation processes are generally applicable to all magnetic species.

In a refinement of the present process, increasing the magnetic separator field of the separation has been found to differentiate among the various magnetic nanoparticles. By varying the field, magnetic nanoparticles having different magnetic moments per volume may be segregated. Such a process can be used to further separate the magnetic nanoparticles to isolate those having desired properties.

It has been discovered that if the helium pressure is increased during the carbon arc discharge process, the carboncoated magnetic particles are formed in the shape of nanotubes instead of nanocrystallites. The application of such nanotubes in composite materials may provide certain advantages. In another modification of the present invention, it has been discovered that amorphous magnetic nanoparticles can be formed by packing the graphite rods with appropriate mixtures of two oxide powders.

In the foregoing specification certain preferred practices and embodiments of this invention have been set out, however, it will be understood that the invention may be otherwise embodied within the scope of the following claims.

We claim:

1. A magnetic metal or magnetic metal carbide nanoparticle having a coating consisting essentially of elemental carbon, said nanoparticle having a diameter in the range of approximately 5 to 60 nm.

2. The nanoparticle of claim 1 wherein said nanoparticle is one of a crystallite having a diameter in the range of approximately 5 to 60 nm, an amorphous particle having a diameter in the range of approximately 5 to 60 nm or a nanotube having a length less than 1 cm and having a diameter in the range of 5 to 60 nm.

3. The nanoparticle of claim 1 wherein said nanoparticle is one of a paramagnetic or ferromagnetic compound.

4. The nanoparticle of claim 3 wherein said ferromagnetic compound is selected from the group consisting of iron, cobalt, nickel, and manganese bismuth.

5. The nanoparticle of claim 3 wherein said paramagnetic compound is selected from the group consisting of the rare earth metals except for lanthanum, lutetium and promethium.

6. A magnetic metal or magnetic metal carbide nanoparticle formed by preparing graphite rods, said graphite rods being packed with a magnetic metal oxide, subjecting said packed graphite rods to a carbon arc discharge to produce soot containing magnetic metal or magnetic metal carbide nanoparticles and non-magnetic species, and applying a magnetic field gradient to said soot to separate said magnetic metal or magnetic metal carbide nanoparticles from said non-magnetic species.

7. The nanoparticle of claim 6 wherein said nanoparticle is one of a paramagnetic or ferromagnetic compound.

8. The nanoparticle of claim 7 wherein said ferromagnetic compound is selected from the group consisting of iron, cobalt, nickel, and manganese bismuth.

9. The nanoparticle of claim 7 wherein said paramagnetic compound is selected from the group consisting of the rare earth metals except for lanthanum, lutetium and promethium.

10. The nanoparticle of claim 7 wherein said nanoparticle is segregated by magnetic moment per volume by varying the magnetic field gradient applied to said soot.

* * * * *